United States Patent [19]

Bergfalk

[11] Patent Number: 4,516,646
[45] Date of Patent: May 14, 1985

[54] SHEAR BEAM LOAD CELL WITH BUILT-IN BEARING ELEMENTS

[75] Inventor: Björn Bergfalk, Karlskoga, Sweden

[73] Assignee: Aktiebolaget Bofors, Bofors, Sweden

[21] Appl. No.: 472,694

[22] Filed: Mar. 7, 1983

[30] Foreign Application Priority Data

Mar. 7, 1982 [SE] Sweden ............................ 8201365

[51] Int. Cl.$^3$ ...................... G01G 3/14; G01G 21/02
[52] U.S. Cl. ............................. 177/211; 177/DIG. 9; 73/862.66
[58] Field of Search ...................... 73/862.65, 862.66; 177/211, DIG. 9

[56] References Cited

U.S. PATENT DOCUMENTS

| | | | |
|---|---|---|---|
| 3,695,096 | 10/1972 | Kutsay | 73/862.66 X |
| 3,741,328 | 6/1973 | Andersson et al. | 177/DIG. 9 X |
| 4,050,531 | 9/1977 | Ashbrook | 177/DIG. 9 X |
| 4,095,660 | 6/1978 | Johansson | 177/211 X |

OTHER PUBLICATIONS

Brochure entitled, "Glass Fabric, Tape, Yarn Coated with Teflon (fluorocarbon resins)," published by Chemical Fabrics Corporation, N. Bennington Rd., Bennington, Vt., Mar. 17, 1970.

Primary Examiner—Thomas H. Tarcza
Assistant Examiner—Patrick W. Foster
Attorney, Agent, or Firm—Pollock, Vande Sande & Priddy

[57] ABSTRACT

The invention relates to a load cell based on the shear force principle comprising a measuring body in the form of a beam (1) supported on its outer end regions (2, 3) and loaded at its center region. The beam is provided with strain gages (10, 11, 12 and 13) mounted in intermediate zones between said end and center regions so as to be affected by deformations in the beam material due to bending of the beam (1) caused by a loading force (F). In order to make the load cell insensitive for unfavorable forces which arise due to thermal expansions or the like each of the outer end portions (2, 3) of the measuring body comprises a built-in ring shaped bearing (22,23,24,25,26). This means that the need for additional mounting details required for mounting the load cells has been eliminated. The load could be applied directly to the center region of the measuring body via a simple load coupling means (6).

7 Claims, 7 Drawing Figures

4,516,646

SHEAR BEAM LOAD CELL WITH BUILT-IN BEARING ELEMENTS

The present invention relates to a load cell based on the shear force principle comprising a measuring body in the form of an elongated beam supported on its outer end regions and loaded at its center region. Strain gages are mounted in intermediate zones between said end and center regions so as to be affected by deformations in the beam material due to bending of the beam caused by the loading force.

It is previously known to use beam type load cells or force transducers based on resistive strain gages in electronic weighing equipment. The reason is that such load cells are very reliable and able to maintain calibration and repeatability specifications for a long time and during unfavourable measuring conditions. Due to their comparatively small dimensions the beam type load cells are very quick and easy to install and a low overall height can be obtained. The load cells are normally cylindrical which makes it possible to replace an existing shaft or other mechanical element which simplifies the installation of the load cell in existing mechanical systems in which the weighing equipment should be incorporated.

An important advantage of load cells based on the shear force principle derives from the fact that such load cells are substantially insensitive to side forces, i.e. such forces which act in directions which are different from the measuring direction. No flexural side supports or the like are required, the load cells can accept side forces up to 100–200% of the rated load.

There are, however, also other undesired forces affecting a load cell, especially such "parasitic" forces which are caused by temperature variations. The strain gages which are used in the load cell are also affected by the temperature, among other things due to the fact that the measuring body and the strain gage wires have different thermal expansivities. If, however, at least four equal strain gages are used and bonded to the same material, then the resistance changes caused by temperature variations will be the same. If the strain gages then are connected in a conventional measuring bridge no unbalance of the bridge will arise under the influence of such resistance changes.

Further undesired forces which are influencing the weighing accuracy are caused for instance by the temperature variations of the weighing platform or the weighing frame. For that reason the load cell has usually been provided with additional bearings or other mounting details so that undesired forces such as side forces or bending moments do not affect the load cell. Then the load cell has usually been mounted with its outer end regions supported in clevis bearings or the like with cylindrical or other well usually arcuate defined contact surfaces. In this case the load has also been applied by means of a bearing on the center region of the measuring body of the load cell.

As a consequence it has previously been necessary to deliver specific mounting details as a complement to the load cell itself for almost every weighing application. As an alternative for such complementary mounting details the user could take care of the mounting of the load cell according to instuctions provided by the supplier. In both cases, however, an extra cost is involved additional to the load cell price.

SUMMARY OF INVENTION

The main object of the present invention is to minimize the number of such additional mounting details, preferably so that no such extra mountings at all are required, i.e. the load cell is offered in a single unit ready for application.

The invention is mainly characterized by the fact that the outer end regions of the measuring beam is provided with a built-in bearing. By means of the built-in bearing any additional mounting details previously required to reduce the effect of unfavourable forces are now eliminated. By using the built-in bearing the load cell can be loaded by means of a simple load coupler without any additional bearing.

DESCRIPTION OF THE FIGURES

In the following the invention will be further described with reference to the accompanying drawings in which a number of different embodiments of the load cell has been illustrated.

DESCRIPTION OF THE PREFERRED EMBODIMENTS

Figure 1:
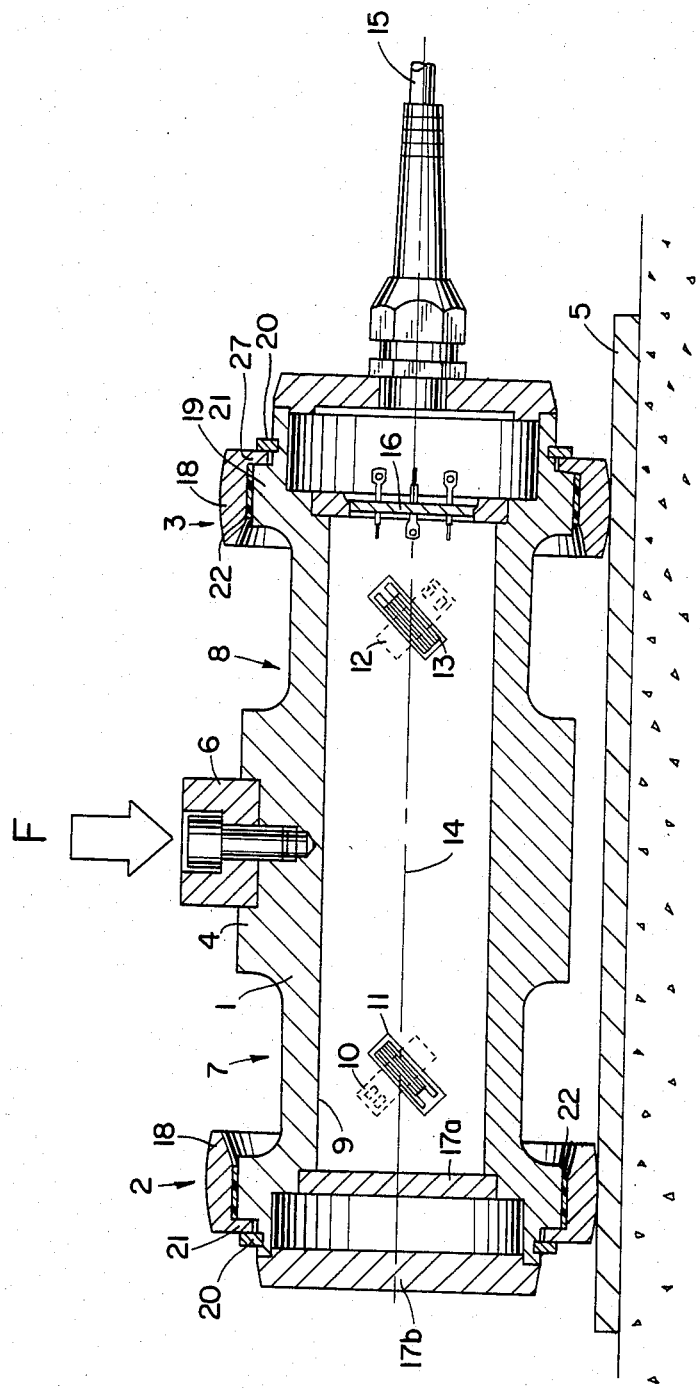
FIG. 1 is a longitudinal section of a load cell provided with a built-in bearing in the form of a slide bearing.

In the different embodiments of the load cell which are described in the following corresponding components are provided with the same reference numerals. The basic shape is also the same for the different embodiments of the load cell, but the specific built-in mountings are different. As illustrated in the figures the measuring body 1 of the load cell mainly comprises a hollow, cylindrical beam with two outer end regions 2, 3 for supporting the load cell and a center region 4 on which the load is applied and indicated by loading force F in the figures.

The load cell is preferably mounted horizontally, for instance for weighing tanks and containers, which means a simple installation and a low profile. The mounting base is often a concrete floor or the like. If the bearing of the mounting base is insufficient then a hardened mounting plate or the like could be used for distributing the point stresses from the load cell on the mounting base.

As illustrated in the figures the two outer end regions as well as the center region are ring shaped with a radius exceeding the radius of the remaining parts of the load cell measuring body. When a load is applied on the center region 4 of the load cell by means of a simple loading yoke 6 then the load cell is affected by a shearing force so that deformations of the beam material are concentrated to the intermediate zones 7, 8 between the two outer end regions and the center region due to reduced material thickness in these zones.

The measuring body 1 is also provided with an axial recess 9 extending through the body which permits a more protected location of the strain gages and more space for the electrical connection leads from the strain gages. Four strain gages 10, 11, 12 and 13 are positioned within the recess in said intermediate zones and affixed to opposite sides of the recess inner surface which are parallel to the bending plane of the beam. The strain gages are also arranged in such a way that they are affected by the deformations of the beam material in two mutually perpendicular directions forming an angle of 45° to the longitudinal axis 14 of the beam. In a known way the sensitivity of the load cell has been increased by connecting the two load cell pairs 10, 11 and 12, 13, respectively, into four branches of a conventional Wheatstonebridge. A cable 15 is connecting the strain gages lead wires via a bushing 16 arranged at one of the two end portions of the measuring beam. The other end of the measuring beam is provided with an inner circular end closure 17a and an outer lid 17b.

As already mentioned in the introductory part of the specification, conventional load cells have usually been provided with separate mounting details in the form of clevis bearings or the like provided with arcuate or other well-defined contact surfaces as well as load coupling means with bearings in order to prevent unfavourable forces to affect the load cells. Especially when weighing big tanks and containers such unfavourable forces could happen due to thermal expansion and also due to the wind.

Such separate mounting details are unnecessary in the present load cell. Instead of using these separate mounting details the end regions of the load cell are provided with built-in bearings to make the load cell insensitive to the unfavourable forces. This means that the load cells can be located directly on a mounting base or foundation having sufficient bearing strength and it also means that a simple load coupling means could be used which is attached by screws or the like directly to the center region of the load cell beam.

In the embodiment which has been illustrated in FIG. 1 a built-in bearing in the form of a slide bearing is arranged in the outer end regions of the beam. The slide bearings are formed between an outer arcuate or cylindrical ring 18 having a L-formed section and an inner cylindrical ring 19 formed directly on the outer surface of the measuring beam. The outer spherical rings are made of a hardened material, for instance of steel, and are retained in their accurate longitudinal positions by means of locking rings 20 which are in contact with the angled part 21 of the ring 18. In order to facilitate the manufacture the inner cylindrical ring is provided with an inner, plane cylindrical surface preferably with the same radius as the cylindrical load coupling means 4. The outer ring is provided with a corresponding plane inner cylindrical contact surface. In the contact surface between the cylindrical surfaces of the rings a slide bearing 22 of PTFE-coated fabric or Teflon has been disposed in order to facilitate a sliding movement between the arcuate outer ring and the measuring body.

Figure 2:
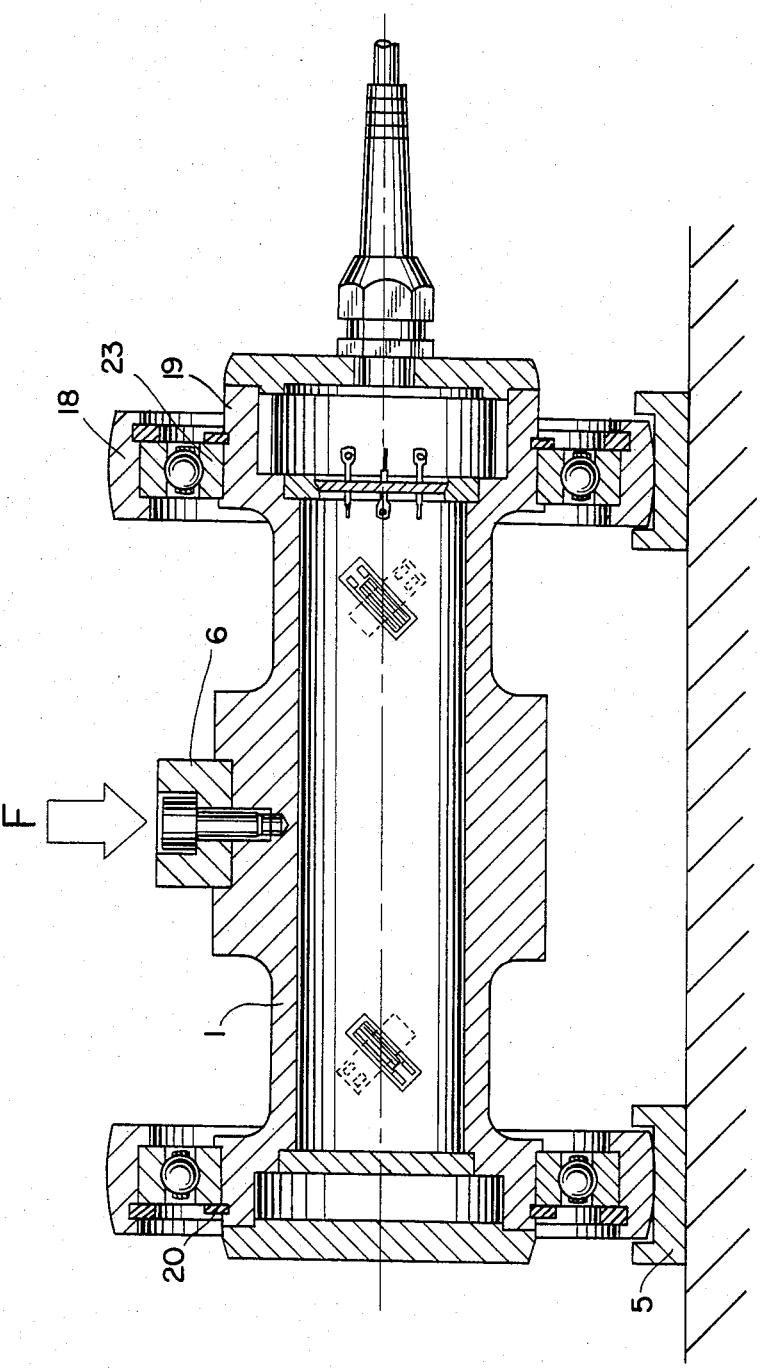
FIG. 2 is a load cell with a ball bearing.

In FIG. 2 another embodiment is illustrated in which the built-in bearing comprises a ball bearing 23 arranged between an outer ring 18 and an inner cylindrical ring 19 which is formed directly on the measuring body corresponding to the ring 19 in FIG. 1. The ball bearing 23 is secured between the two rings by means of an inner and outer locking ring 20. Instead of one supporting plate in this case the load cell is supported on two supporting grooves preferably made of steel.

Figure 3:
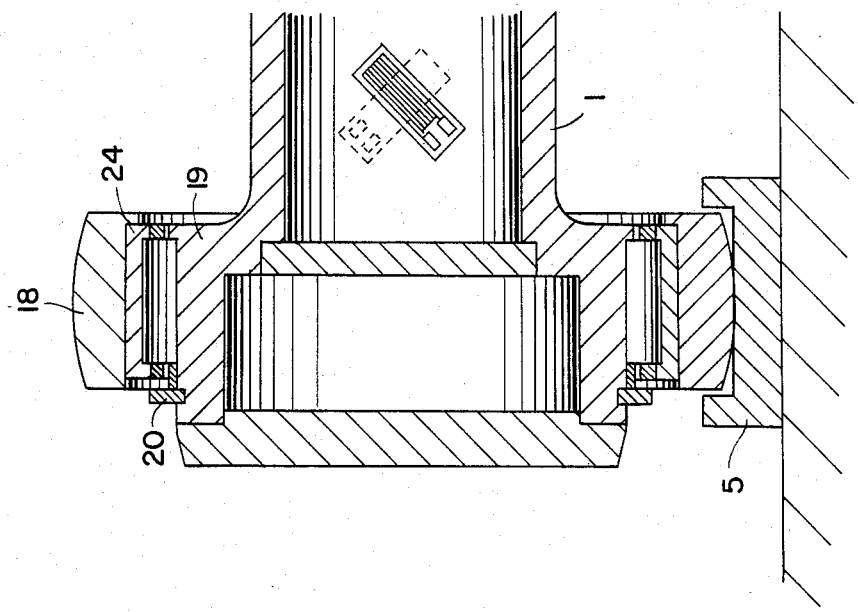

In FIG. 3 the left, outer part of a further embodiment of a load cell measuring body is shown and in which the built-in bearing comprises a nail bearing 24. Also in this case the end region of the beam comprises an outer hardened ring 18 and an inner cylindrical ring 19 formed directly on the cylindrical surface of the measuring body. The nail bearing is secured between the two rings by means of a locking ring 20.

Figure 4:
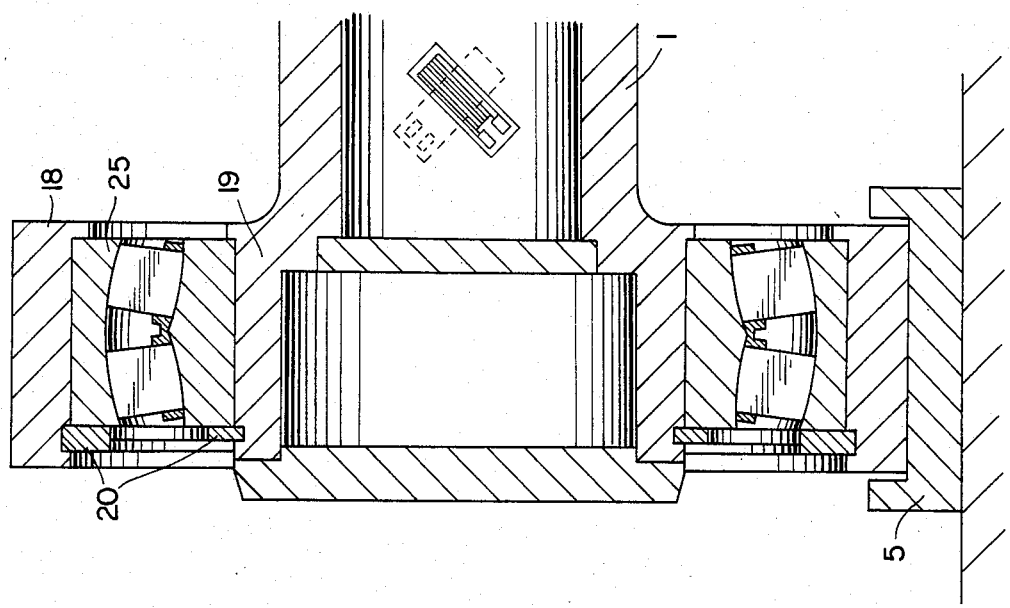
FIGS. 3 and 4 show one of the outer end regions of a load cell with a roller bearing and a nail bearing, respectively.

FIG. 4 illustrates another embodiment in which the built-in bearing comprises a spherical roll bearing 25. In this case the outer ring 18 is provided with a cylindrical surface instead of a spherical surface. Two locking rings are securing the roll bearing 25 in its proper position between the rings. In both the FIGS. 3 and 4 supporting grooves are used for the load cell.

Figure 5:
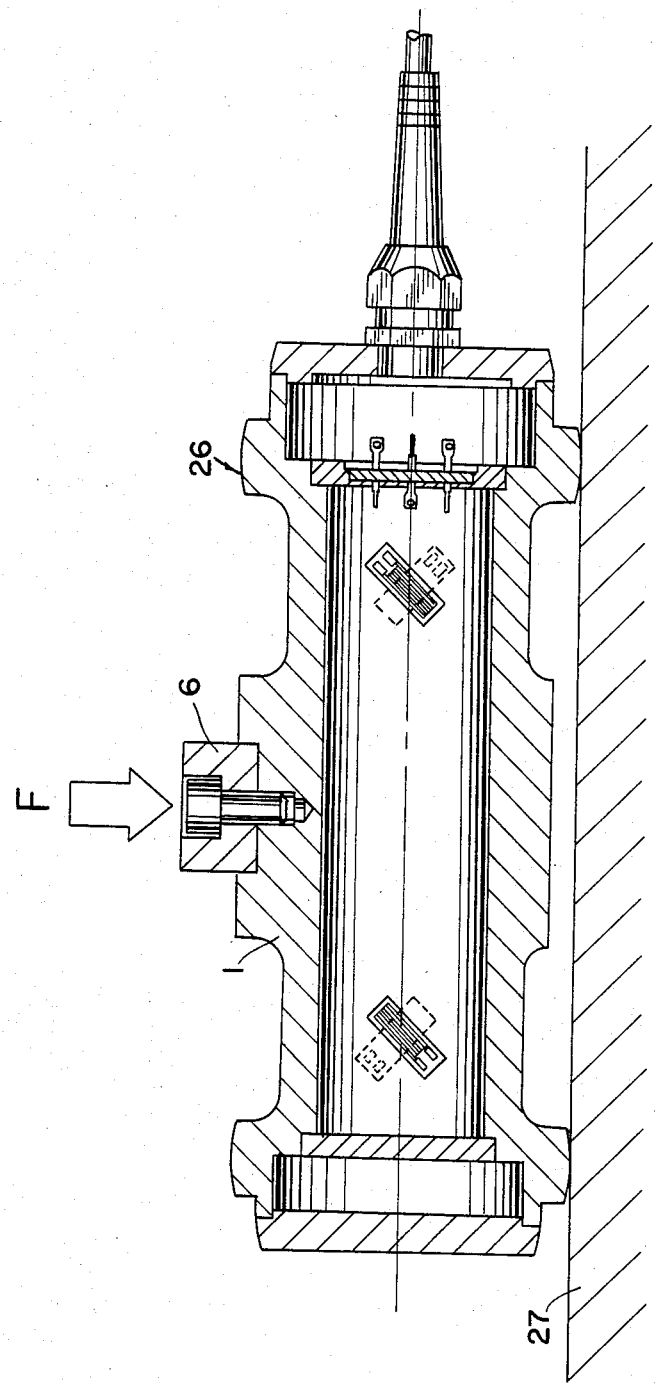
FIG. 5 shows a load cell in which spherical supporting rings are formed directly on the cylindrical surface of the measuring beam so that the built-in bearing is formed by the contact surface between the spherical rings and the mounting base.

In the embodiment illustrated in FIG. 5 the built-in bearing simply is made of a ring-shaped part 26 made directly on the cylindrical surface of the measuring body. In this case the bearing itself is formed by means of the contact between the ring-shaped part 26 and the mounting base 27. This load cell can be used in such applications in which a constant temperature is expected and in which the accuracy requirements are low, for instance supervising the fluid level of a tank or the like.

Figure 7:
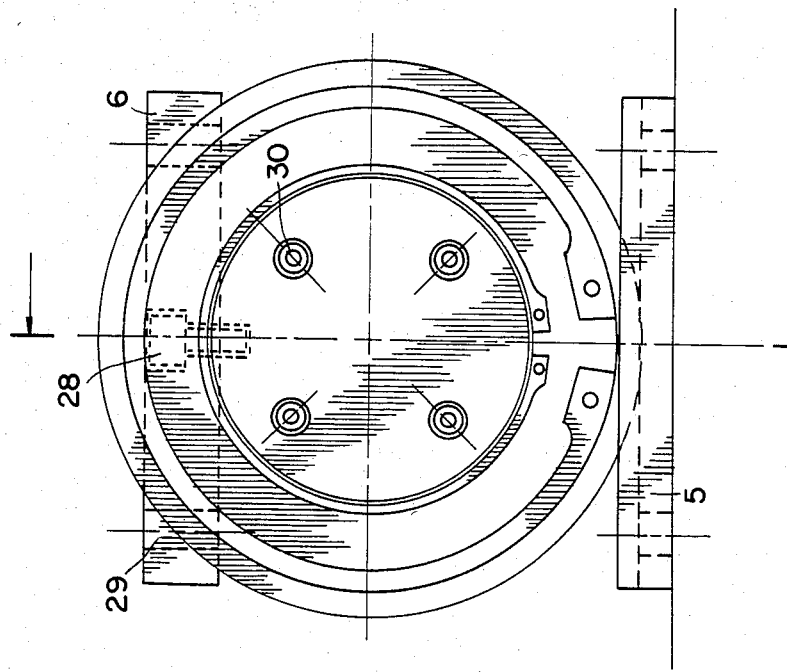
FIGS. 6 and 7 show end views of the load cell according to FIG. 1 and FIG. 2, respectively.
Figure 6:
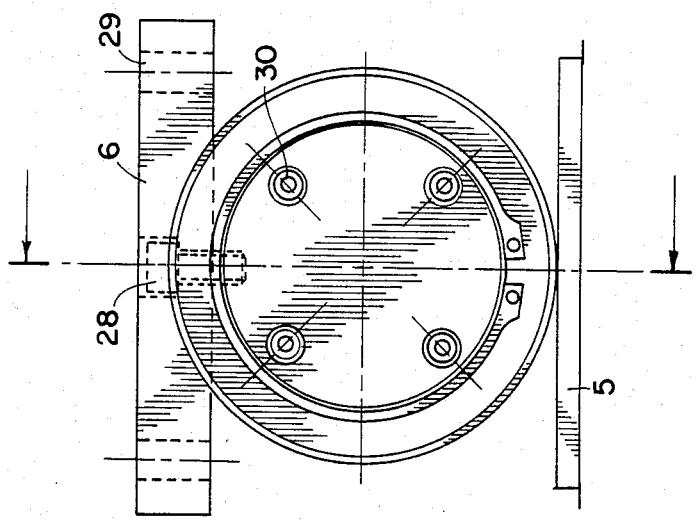

In the FIGS. 6 and 7, finally, two end views of the load cell according to FIGS. 1 and 2 are shown. As illustrated the loading yoke is made of a simple element 6 which is secured by means of a screw 28 in the center region of the load cell and provided with two holes 29 to facilitate the mounting of the load cell into the equipment in question. As shown in the figures the outer lid 17b is secured to the measuring body by means of four screws 30.

The invention is not limited to the above embodiments but can be modified within the scope of the following claims. The beam type measuring body can for instance have a square section instead of circular provided that its outer end regions are provided with a built-in bearing. Furthermore it is not necessary that the beam is hollow, instead the beam could be solid in which case the strain gages are located on the outer surface of the measuring beam in said intermediate zones.

What is claimed is:
1. A load cell comprising:
a beam-shaped measuring body including strain gages for providing electrical signals in response to a shear force applied through said measuring body by a measurement force, and
first and second cylindrical end pieces supporting said measuring body through first and second built-in bearing means above a support surface, said end pieces having a diameter which maintains said measuring body above said support surface when deflected by an applied measuring force, and said built-in bearing means preventing said measuring body from measuring extraneously applied forces.

2. A load cell according to claim 1 wherein said bearing means comprises a slide bearing formed between an outer ring of said end pieces and an cylindrical ring formed directly on the outer surface of the measuring body.

3. A load cell according to claim 2 wherein the slide bearing is made of PTFE coated fabric disposed on the contact surface between the outer and inner cylindrical rings.

4. A load cell according to claim 1 wherein said bearing means comprises a roller bearing between an outer ring on said end pieces and an inner, cylindrical ring formed directly on the outer surface of the measuring body.

5. A load cell according to claim 1 wherein said bearing means comprises a nail bearing between an outer ring on said end pieces and an inner cylindrical ring formed directly on the outer surface of the measuring body.

6. A load cell according to claim 1 wherein said bearing means comprises a roller bearing between an outer, cylindrical ring of said end pieces and an inner cylindrical ring formed directly on the outer surface of the measuring body.

7. A load cell according to claim 1 wherein said bearing means comprises a ring-shaped part formed directly on the outer surface of the measuring body for contacting the supporting base.

* * * * *